Nov. 24, 1953  I. E. BLOOM  2,660,092
EYEGLASS ATTACHMENT
Filed Nov. 2, 1950

INVENTOR
*Ildiko E. Bloom*
BY
*Pennie, Edmonds, Morton and Barrows*
ATTORNEYS

Patented Nov. 24, 1953

2,660,092

UNITED STATES PATENT OFFICE 2,660,092

EYEGLASS ATTACHMENT

Ildikó E. Bloom, Closter, N. J.

Application November 2, 1950, Serial No. 193,690

1 Claim. (Cl. 88—51)

This invention relates to attachments for eyeglasses and, more especially, to devices for holding eyeglass frames in position on the face. The invention may be used for corrective eyeglasses and for sun glasses as well.

In the usual construction, eyeglass frames are provided with temples hinged to the end members for holding the glasses in place. These temples are made of stiff, comparatively rigid material and either press against the sides of the head or curve partially around the ears in order to keep the glasses from falling off. These stiff temples are not the smallest factor in rendering conventional glasses uncomfortable to wear, in addition the position of the eyeglasses is not secure, and ofttimes the frame shifts so that the lenses are no longer in proper position with respect to the eyes, or falls off entirely.

It is the primary object of the present invention to eliminate completely the conventional temples from eyeglasses and to provide a device for holding the eyeglass frames in position on the face which renders the glasses unbelievably comfortable to wear and gives a remarkable feeling of security.

Another objective of the invention is the provision of a device for holding eyeglasses in place which also enables the wearer to fasten the glasses, when temporarily not in use, to the wrist by a simple motion.

Still another objective is to provide an eyeglass attaching device which enables the glasses to be stored in a comparatively small space, thus rendering the glasses easier to carry about.

The invention will be understood from a consideration of the accompanying drawings and the following detailed description, the drawings showing several embodiments of the invention by way of example.

Figure 1:
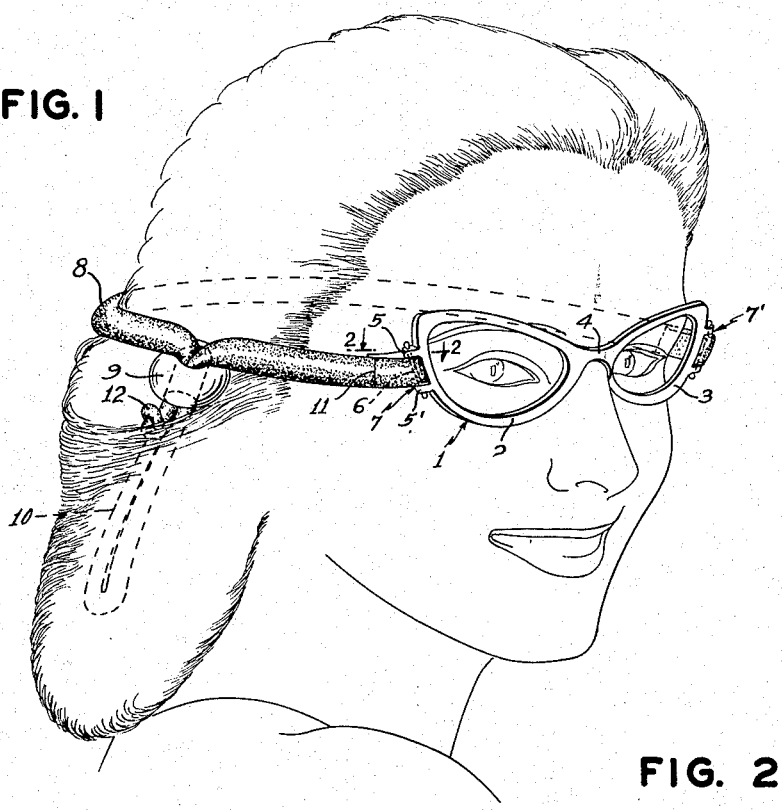
Fig. 1 is a perspective view showing an eyeglass frame held in position on a woman's face by the device of the invention.
Figure 2:
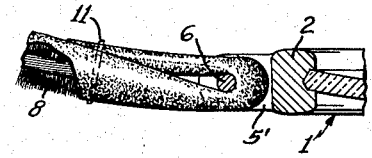
Fig. 2 is a detail section taken on line 2—2 of Fig. 1.

Referring now to these drawings, and first to Figs. 1 and 2, the frame 1 of the eyeglasses is of conventional construction and of any desired style, and includes a pair of eye wires 2 and 3 connected by a bridge 4, the eye wires being made to accommodate any type, or shape, of corrective lens or sun glass. In place of the usual end pieces for the temple hinges, the outside portion of each eye wire is, in Fig. 1, provided with a pair of spaced ears or projections 5 and 5' connected by a pin member 6. With the shell or plastic frame shown, the ears 5, 5' are preferably of the same material as the frames, and pin 6 is of metal.

These parts, ears 5, 5', and pin 6 constitute a connecting device which, for convenience, may be designated generally by reference numeral 7. Attached to one of these connecting devices, for example, device 7' is one end of a continuous flexible band 8 which extends along the left side of the woman's head, thence around the back and along the opposite or right side of the head where the opposite end of this band is attached to connecting device 7 on eyeglass frame 1. The length of band 8 is in excess of the perimeter of the head, and a fastening device such, for example, as the slidable and frictionally held ceramic ring 9 (preferably in a contrasting color), serves to take up the excess length of band 8 and form it into a loop 10.

The ends of band 8 may be secured to the connecting devices 7 and 7' in any suitable manner. As shown in Fig. 2 the end of the band is looped around pin 6, turned against the side of the band and held in place by means of stitching 11. In the form of the invention illustrated the band 8 is a cord about $\tfrac{1}{8}$ of an inch in diameter made of a deep pile fabric such as velvet or velveteen, and in which the deep pile fibers stand out from the core in all directions. Moreover, a small knob-like formation or enlargement 12 is formed at the center of the band 8 to prevent ring 9 from being displaced from the band. With the aperture in ring 9 snugly fitting the sides of band 8 the resiliency of the deep pile of the fabric holds the band 9 in any position to which it may be adjusted but without applying tension or pressure circumferentially of the head.

It will be understood that band 8 may be made of other materials, such, for example, as other textile materials, or leather (for example, braided leather), or of strung beads, or of chain. Also ring 9 may be made of any appropriate material, or in fact other adjusting devices for varying the length of the band 8 so as to make it fit the head snugly but without pressure may be employed. It will also be understood that the loop 10 may be arranged in any desired position, for example, at the rear of the head, or at either side. A convenient position for this loop has been found to be immediately behind the ear, and the loop may be tucked beneath the hair if desired. In fact the entire band 8 may be placed beneath or within the hair instead of on the outside of the hair as shown.

Although band 8 might be made of yielding, resilient material, the full advantages of the invention are obtained when this band is constructed of material which is substantially inelastic, since the purpose of the invention is to relieve the head from a sense of tension or pressure in holding the eyeglass frames in position.

Figure 3:
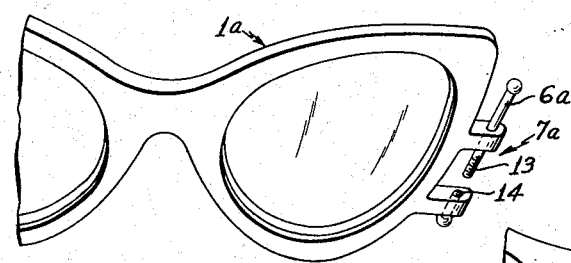
Fig. 3 is a fragmentary view of a modified form of eyeglass frame.

Referring now to the modification shown in Fig. 3, the connecting device 7a is similar to the connecting devices 7 and 7' previously described except for the fact that the pin 6a is removable, at least in part, being threaded at its lower end as shown at 13 so as to be received in a threaded aperture 14 in the lower projection from the eyeglass frame 1a. The purpose of this is to enable the wearer to substitute bands of different color as she desires.

Figure 4:
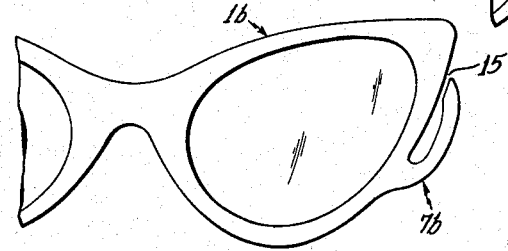

The modified frame 1b shown in Fig. 4 is provided with a different form of connecting device 7b, for the same purpose. In this form the connecting device is constituted of an eye or loop which is open, for example, at its upper end to provide a slot 15 for the insertion and removal of the attaching devices on the ends of band 8.

Figure 5:
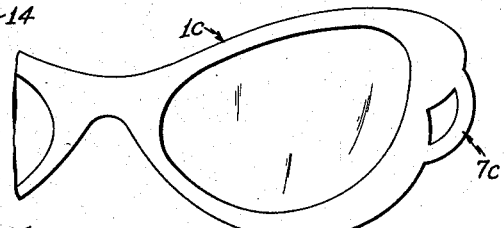
Figs. 4 and 5 are similar views of other modifications.

In Fig. 5 the eyeglass frame 1c has a connecting device 7c which comprises a completely closed loop.

This invention is extremely light in weight at the sides of the head where the conventional temples are located when eyeglasses of the usual construction are worn, and this feature contributes to the comfort experienced in wearing eyeglasses provided with the invention. Also the device of the invention enables the glasses to be held snugly in position and prevents them from being easily displaced. A further advantage of the invention is that if the glasses do become displaced they cannot be lost or damaged because they cannot fall below the neck or chest. In fact, when it is desired to remove the glasses temporarily a slight tug on the eyeglass, frame, or on band 8, will cause the band to slide in ring 9, and the glasses may be dropped as just described, to be quickly replaced in position at any time or the wearer may use the glasses as a lorgnette by suspending them on the neck and raising them to the eyes when examining price tags et cetera during shopping.

If a person uses glasses only when doing extremely fine work, an artist for example, the device of the invention may be used to fasten the glasses to the wrist by a simple motion and in this way the glasses may be carried temporarily in a safe and convenient manner. The band is removed from the neck and slipped over one hand, with the hand in a natural, approximately horizontal position, and with the glasses frame resting on the outer or upper side of the wrist, and the band 8 hanging below the wrist.

Ring 9 is then slid along the band to tighten it around the wrist and the glasses are held in position there in much the same way as they are held in place on the head.

When it is desired to place the glasses in a carrying case, band 8 is wound around the central or bridge section 4 of the frame, and the band being of a soft easily compressed material, the frame and band may be contained in a comparatively small case, so that the attaching device of the invention renders the glasses easier to carry about.

It will be understood that, while several embodiments have been disclosed in describing the invention, it may also be embodied in other constructions without departing from the scope of the appended claim.

I claim:

The combination with an eyeglass frame of a flexible band comprising a cord having an inextensible core and a deep pile extending radially in all directions from the core, said flexible band having its opposite ends attached, respectively, to the opposite sides of said frame, said flexible band having a length substantially in excess of the distance between the opposite sides of said frame extending from one side of the frame around the head of the wearer to the opposite side of the frame, said band extending, when said eyeglass frame is in position, from one side of said frame along one side of the head of the wearer, thence around the back of the head and along the opposite side of the head to the opposite side of said frame, said excess length of the band being formed into a free loop intermediate the attached opposite ends of the band, and an annular fastening member surrounding the loop and slidable thereon to adjust the effective length of the band between the sides of said frame and to cause said band to fit snugly about the head, an enlargement on the band of such size as to normally prevent the fastening means from being removed from the loop and so limiting the extent to which the annular fastening means may be moved along the flexible band that the loop is positioned at a place sufficiently remote from the adjacent side of said frame that it may be concealed in the wearer's hair.

ILDIKÓ E. BLOOM.

References Cited in the file of this patent

UNITED STATES PATENTS

| Number | Name | Date |
| --- | --- | --- |
| 1,596,019 | Nelson | Aug. 17, 1926 |
| 1,819,738 | Daniels | Aug. 18, 1931 |
| 2,172,510 | Jaccard | Sept. 12, 1939 |
| 2,194,043 | Jacobi | Mar. 19, 1940 |
| 2,264,351 | Willson | Dec. 2, 1941 |
| 2,449,694 | Froelich | Sept. 21, 1948 |
| 2,504,524 | Hayward | Apr. 18, 1950 |
| 2,581,366 | De Grazia | Jan. 8, 1952 |